(12) United States Patent
Orihara

(10) Patent No.: US 6,371,460 B1
(45) Date of Patent: Apr. 16, 2002

(54) SHOCK ABSORBER

(75) Inventor: Shun Orihara, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/668,363

(22) Filed: Sep. 25, 2000

(30) Foreign Application Priority Data

Oct. 18, 1999 (JP) .......................................... 11-295974

(51) Int. Cl.$^7$ ................................................ F16F 9/54
(52) U.S. Cl. ...................................... 267/137; 267/139
(58) Field of Search ................................ 267/137, 139, 267/130, 116, 119; 188/84; 92/88, 13.5

(56) References Cited

U.S. PATENT DOCUMENTS

| | | | | |
|---|---|---|---|---|
| 2,685,824 A | * | 8/1954 | Coop | 90/59 |
| 3,666,256 A | * | 5/1972 | Ellis et al. | 267/34 |
| 4,122,923 A | * | 10/1978 | Ellis et al. | 188/285 |
| 4,265,344 A | * | 5/1981 | Taylor | 188/322 |
| 4,694,939 A | * | 9/1987 | Heideman et al. | 188/287 |
| 5,052,528 A | * | 10/1991 | Sullivan | 188/317 |
| 5,159,997 A | * | 11/1992 | Heideman et al. | 188/282 |
| 5,335,583 A | * | 8/1994 | Kaneko et al. | 92/13.5 |
| 5,568,982 A | * | 10/1996 | Stoll et al. | 384/55 |
| 5,701,798 A | * | 12/1997 | Noda | 92/88 |
| 5,884,549 A | * | 3/1999 | Hosono et al. | 92/5 |
| 6,014,924 A | * | 1/2000 | Stoll et al. | 92/13.5 |

FOREIGN PATENT DOCUMENTS

| EP | 0 780 535 | * | 6/1997 |
|---|---|---|---|
| JP | 8-145013 | * | 6/1996 |

* cited by examiner

Primary Examiner—Pam Rodriguez
Assistant Examiner—Bradley King
(74) Attorney, Agent, or Firm—Oblon, Spivak, McClelland, Maier & Neustadt, P.C.

(57) ABSTRACT

A cylindrical stopper for determining a stop position of a workpiece by a contact portion at a tip end of the stopper is mounted to a workpiece transferring device such that the stop position of the workpiece can be adjusted by forward and rearward movement of the stopper and a columnar absorber main body for absorbing and cushioning collision energy generated when the workpiece comes into contact with the stopper is mounted in the stopper such that a relationship between positions of a shock-absorbing portion at a tip end of the absorber main body and the contact portion at the tip end of the stopper with respect to each other can be adjusted.

3 Claims, 3 Drawing Sheets

SHOCK ABSORBER

TECHNICAL FIELD

The present invention relates to a shock absorber for absorbing energy generated when a moving workpiece collides with a movement end and stops.

DESCRIPTION OF THE PRIOR ART

A shock absorber for absorbing and cushioning energy generated when a workpiece collides with a movement stopper member and stops is already known without the necessity of citing an example.

FIG. 3 shows a known shock absorber having a stopper collar for positioning and the shock absorber 1 has an absorber main body 2 and the stopper collar 3.

The absorber main body 2 is screwed in a frame 5 through a thread 2a on an outer peripheral face of the absorber main body 2 such that the absorber main body 2 can move forward and rearward in a moving direction of a workpiece 6. The stopper collar 3 is screwed on a tip end side (a collision side of the workpiece 6) of the thread 2a of the absorber main body 2 such that the stopper collar 3 can move forward and rearward.

Both the absorber main body 2 and the stopper collar 3 can be fixed in arbitrary positions in the moving direction of the workpiece 6 by locknuts 2A and 3A screwed on the thread 2a of the absorber main body 2.

The shock absorber 1 has a damper rod 4 for absorbing energy generated when the workpiece 6 collides at a tip end of the absorber main body 2 and the damper rod 4 projects toward the workpiece further than a tip end of the stopper collar 3 screwed on the absorber main body 2.

In the shock absorber 1, because the stopper collar 3 moves forward and rearward integrally with the absorber main body 2 if the locknut 2A is loosened and the absorber main body 2 is moved forward and rearward in the moving direction of the workpiece 6, a stop position (a distance d1 between the workpiece 6 and the frame 5) of the workpiece 6 can be adjusted and the absorber main body 2 is fixed in the position by tightening the locknut 2A.

Because the length d2 by which the damper rod 4 projects from an end face of the stopper collar 3 changes if the locknut 3A is loosened and the stopper collar 3 is moved forward and rearward along the absorber main body 2, the operating range of the shock absorber for absorbing collision energy, i.e., absorbing performance of the shock absorber can be adjusted and the stopper collar 3 is fixed in position by tightening the locknut 3A.

However, in this shock absorber 1, because the stop position (the distance d1) of the workpiece 6 changes if the operating range is adjusted by moving the stopper collar 3 forward and rearward along the absorber main body 2, it is necessary to adjust the stop position again.

Furthermore, because the stopper collar 3 is screwed on the tip end side of the thread 2a of the absorber main body 2, there is a limit as to reduction the of the stop distance d1 of the workpiece 6 with respect to the frame 5.

On the other hand, FIG. 4 shows another structure of a known shock absorber. The shock absorber 11 has an absorber main body 12 and an adjustment bolt 13. The body 12 and bolt 13 are separately screwed in the frame 5 through threads formed on their outer peripheral faces such that the body 12 and bolt 13 are oriented so as to be parallel to each other and can move forward and rearward with respect to a moving direction of a workpiece 6. The body 12 and bolt 13 can be fixed in arbitrary positions in the moving direction of the workpiece 6 by locknuts 12A and 13A screwed on the threads.

Because the absorber main body 12 and the adjustment bolt 13 are provided separately and parallel to each other in the shock absorber 11, it is possible to reduce the stop distance d1 of the workpiece 6 with respect to the frame 5 as compared with the shock absorber 1 shown in FIG. 3. frame 5 as compared with the shock absorber 1 shown in FIG. 3.

However, because the distance d2 between an end face of the adjust bolt 13 and a tip end of a damper rod 14 changes if the adjustment bolt 13 is moved forward and rearward to adjust the stop distance d1 of the workpiece 6, it is necessary to adjust an operating range for absorbing collision energy again.

Therefore, it is necessary to separately carry out adjustment of the stop position of the workpiece 6 and adjustment of the operating range and such adjusting operations are burdensome.

Moreover, because the absorber main body 12 and the adjustment bolt 13 are disposed in different positions in parallel to each other and are not coaxial with each other, the workpiece 6 may be inclined when the workpiece 6 collides with the absorber main body 12 or the adjustment bolt 13.

DISCLOSURE OF THE INVENTION

It is an object of the present invention to provide a shock absorber for easily adjusting a stop position of a workpiece that collides with a movement end and stops and energy absorbing performance.

To achieve the above object, a shock absorber according to the present invention comprises a stopper for determining a stop position of a workpiece by directly or indirectly coming into contact with the workpiece that has reached a transfer end and an absorber main body for absorbing and cushioning collision energy generated when the workpiece comes into contact with the stopper, wherein the stopper has at a tip end thereof a contact portion with which the workpiece comes into contact and is mounted on a workpiece transferring device such that the stop position of the workpiece can be adjusted, and the absorber main body has at a tip end thereof a shock-absorbing portion for absorbing the collision energy and is mounted to the stopper such that the absorber main body is coaxial with the stopper and that a relationship between positions of the contact portion at the tip end of the stopper and the shock-absorbing portion with respect to each other can be adjusted.

In the shock absorber of the invention having the above structure, the stop position of the workpiece can be adjusted by moving the stopper forward and rearward. In this case, the absorber main body is mounted to the stopper, moves with the stopper, and does not move with respect to the stopper. Therefore, the operating range for absorbing the energy by the absorber main body does not change.

The operating range is adjusted by moving the absorber main body forward and rearward with respect to the stopper. At this time, although the absorber main body moves with respect to the stopper and a distance between the contact portion and the shock-absorbing portion changes, the stopper does not move. Therefore, the stop position of the workpiece does not change.

Therefore, because adjustment of the stop position of the workpiece by the stopper and adjustment of the operating range of energy absorption by the absorber main body can be carried out separately, adjusting operations are easy.

According to a concrete embodiment of the invention, the stopper has a cylindrical shape, threads are respectively formed on an inner periphery and an outer periphery of the stopper, the absorber main body has a columnar shape, a thread is formed on an outer periphery of the absorber main body, the stopper is screwed in a threaded hole of the workpiece transferring device such that the stopper can move forward and rearward by rotation, the stopper can be fixed in an arbitrary position by a locknut screwed on the thread on the outer periphery, the absorber main body is screwed in the stopper such that a tip end portion and a rear end portion of the absorber main body projects outside from the stopper, and the absorber main body can be fixed in an arbitrary position by a locknut screwed on the thread on the outer periphery at the rear end portion.

As the transferring device, there is a rodless cylinder, for example.

DESCRIPTION OF THE PREFERRED EMBODIMENTS

Figure 1:
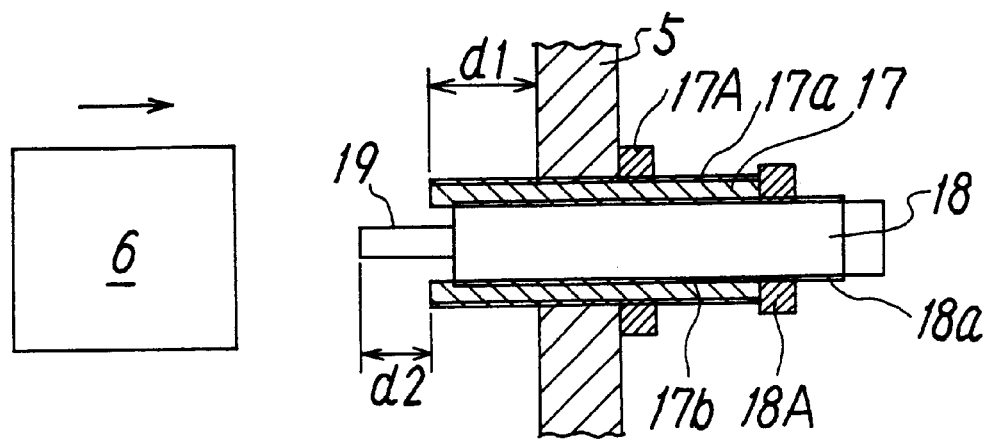
FIG. 1 is a sectional view of an embodiment of the present invention.

FIG. 1 shows a preferred embodiment of a shock absorber according to the invention. The shock absorber 16 has a cylindrical stopper 17 that directly or indirectly comes in contact with a workpiece 6 to determine a stop position of the workpiece 6 and a columnar absorber main body 18 coaxially mounted in the stopper 17.

The stopper 17 has an external thread 17a and an internal thread 17b on its outer and inner peripheries and is mounted to a frame 5 of a workpiece transferring device through the external thread 17a on the outer periphery such that the stopper 17 can move forward and rearward in a moving direction of the workpiece 6. The absorber main body 18 is mounted to the stopper 17 by screwing an external thread 18a formed on an outer periphery of the absorber main body 18 in the internal thread 17b in the stopper 17 such that the absorber main body 18 can move forward and rearward in the moving direction of the workpiece 6 with respect to the stopper 17.

The stopper 17 and the absorber main body 18 can be fixed in arbitrary positions in the forward and rearward moving direction by locknuts 17A and 18A that are separately screwed on the external threads 17a and 18a.

The absorber main body 18 has a damper rod 19 at its tip end similarly to the absorber main body in the above-described known shock absorber and energy generated in collision of the workpiece 6 is absorbed by the damper rod 19.

In the above embodiment, because a distance d1 between the stopper 17 and the frame 5 changes if the locknut 17A is loosened and the stopper 17 is moved forward and rearward with respect to the frame 5, a stop position of the workpiece 6 can be adjusted and the stopper 17 is fixed in the position by tightening the locknut 17A in this state.

In this case, because the absorber main body 18 moves forward and rearward integrally with the stopper 17 when the stopper 17 moves forward and rearward, the distance d2 between a tip end face of the stopper 17 and a tip end of the damper rod 19 does not change. Therefore, the range in which the damper rod 19 operates for shock absorbing in collision of the workpiece does not change and energy absorbing performance of the shock absorber 16 does not change if the stop position of the workpiece 6 is changed.

Because the distance d2 between the tip end of the stopper 17 and the tip end of the damper rod 19 changes if the locknut 18A is loosened and the absorber main body 18 is moved forward and rearward with respect to the stopper 17, the operating range of the damper rod 19 for absorbing impact energy can be adjusted and the absorber main body 18 is fixed in the position by tightening the locknut 18A in this state.

In this case, because the stopper 17 screwed in the frame.5 does not move if the absorber main body 18 moves forward and rearward, the stop position of the workpiece 6 does not change.

Therefore, adjustment of the stop position of the workpiece 6 and adjustment of the operating range of the damper rod 19 can be carried out independently of each other, the adjusting operations are easy.

Because the stopper 17 and the absorber main body 18 are concentric with each other, the workpiece 6 does not incline when it collides if the shock absorber 16 is brought into contact with the workpiece at a center of gravity of the workpiece in balance.

Figure 2:
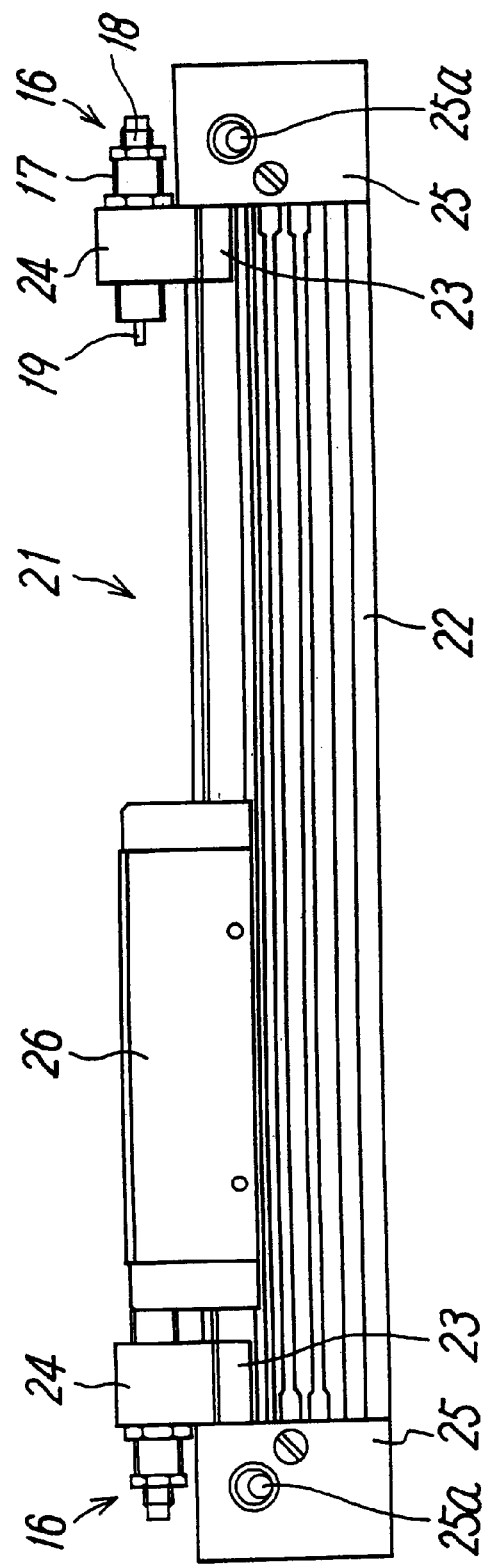
FIG. 2 is an explanatory view of a form of use of the embodiment.
Figure 3:
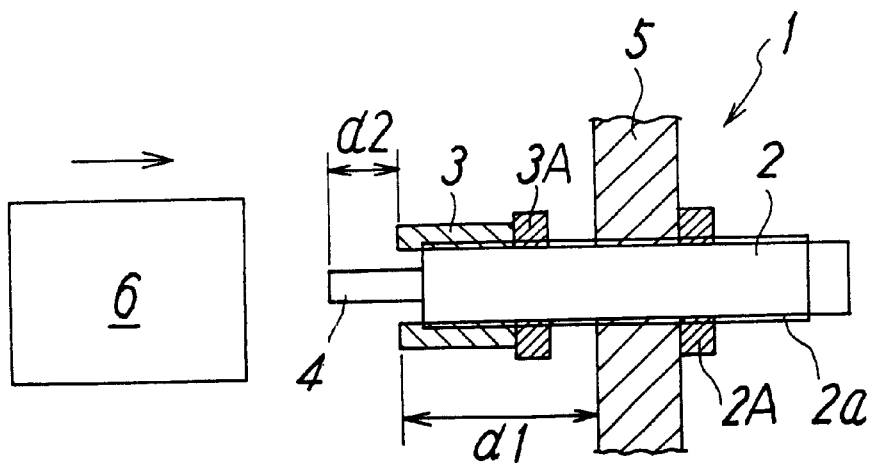
FIG. 3 is a sectional view of a known shock absorber.
Figure 4:
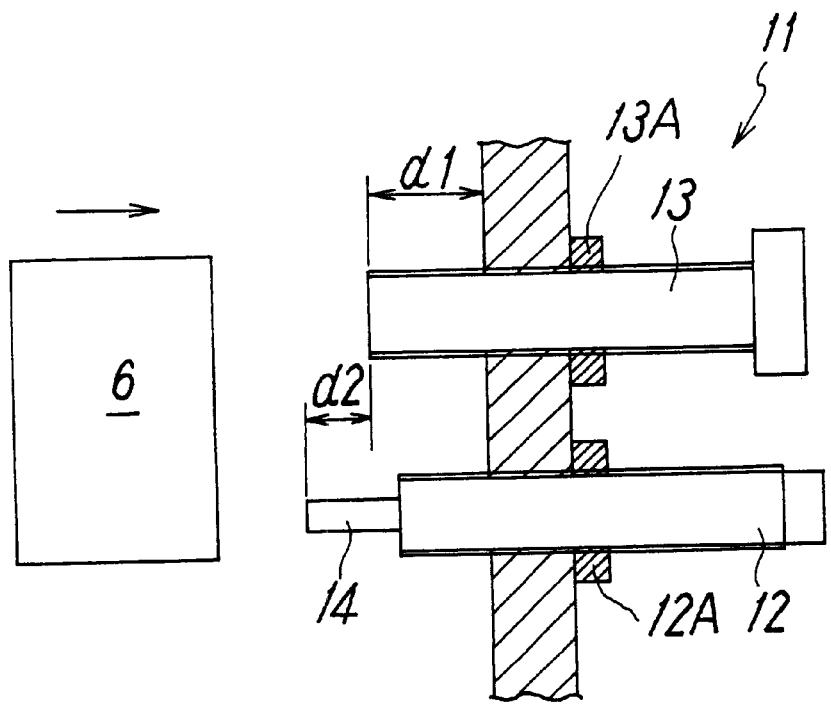
FIG. 4 is similarly a sectional view of another known shock absorber.

FIG. 2 shows an example of a form of use of the shock absorber according to the invention. The shock absorber 16 is incorporated into a rodless cylinder 21 as an example of a fluid pressure device. It shows the mounting of pedestals 24 on clamp hardware pieces 23 mounted to opposite ends of a cylinder tube 22 where the shock absorber 16 is mounted.

The rodless cylinder 21 has the cylinder tube 22 having therein a cylinder bore extending in an axial direction, a piston housed for sliding in the cylinder bore in the cylinder tube 22, end blocks 25, 25 mounted to the opposite ends of the cylinder tube 22, and ports 25a, 25a formed in the end blocks 25, 25 and the clamp hardware pieces 23 are respectively mounted to the end blocks 25, 25. A table 26 on which the workpiece is to be placed is disposed on the cylinder tube 22 such that the table 26 can move along the cylinder tube 22 and the table 26 and the piston are coupled through a mechanical or magnetic coupling. If compressed air is supplied and discharged to and from the cylinder tube 22 through the ports 25a, 25a, the piston and the table 26 move along the cylinder tube 22 and the workpiece placed on the table 26 is transferred to a stroke end. At this time, an end portion of the table 26 comes into contact with the damper rod 19 of the shock absorber 16 at the stroke end, thereby absorbing the energy of the collision.

The rodless cylinder 21 is an example for which the shock absorber 16 is used and a device into which the shock absorber 16 is incorporated is not limited to the rodless cylinder.

What is claimed is:

1. A shock absorber comprising:
    stopper means for determining a stop position of a workpiece by directly or indirectly coming into contact with the workpiece which has reached a transfer end;
    an absorber main body means for absorbing and cushioning collision energy generated when the workpiece comes into contact with said stopper, wherein said stopper means has at a tip end thereof a contact portion with which the workpiece is engageable and is mounted to a workpiece transferring device such that said stop position of said workpiece is adjustable, and said absorber main body means having at a tip end thereof a shock-absorbing portion for absorbing the collision energy and is mounted to said stopper means such that said absorber main body means is coaxial with said stopper and that a relationship between positions of said contact portion at said tip end of said stopper means and said shock-absorbing portion with respect to each other is adjustable wherein said stopper means has a substantially cylindrical shape and has threads respectively formed on an inner periphery and an outer periphery of said stopper means, said absorber main body means has a substantially columnar shape, a thread is formed on an outer periphery of said absorber main body, said stopper means is screwed in a threaded hole of said workpiece transferring device such that said stopper means can move forward and rearward by rotation, said stopper is fixable in an arbitrary position by a locknut screwed on said thread on said outer periphery, said absorber main body means is screwed in said stopper such that a tip end portion and a rear end portion of said absorber main body means projects outside from said stopper, and said absorber main body means is fixable in an arbitrary position by a locknut screwed on said thread on said outer periphery at said rear end portion.

2. A shock absorber according to claim 1, wherein said transferring device comprises a rodless cylinder.

3. A shock absorber according to claim 2, wherein said rodless cylinder includes a cylinder tube having therein a cylinder bore extending in an axial direction, a piston for sliding in said cylinder bore by operation of fluid pressure, end blocks respectively mounted to opposite ends of said cylinder tube, a table on which said workpiece is positionable and which is provided to move along said cylinder tube, and a coupling for coupling said table and said piston, said shock absorber being mounted to each said end block, and wherein said table contacts with said shock absorbers at stroke ends of said table.

* * * * *